(12) United States Patent
Tashiro et al.

(10) Patent No.: US 9,524,180 B2
(45) Date of Patent: Dec. 20, 2016

(54) MANAGING VIRTUAL MACHINES USING TRACING INFORMATION

(71) Applicant: FUJITSU LIMITED, Kawasaki-shi, Kanagawa (JP)

(72) Inventors: Tomohiko Tashiro, Numazu (JP); Masao Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 316 days.

(21) Appl. No.: 14/070,766

(22) Filed: Nov. 4, 2013

(65) Prior Publication Data
US 2014/0259011 A1 Sep. 11, 2014

(30) Foreign Application Priority Data
Mar. 5, 2013 (JP) ................................. 2013-043158

(51) Int. Cl.
 G06F 9/455 (2006.01)
 G06F 9/44 (2006.01)
 G06F 21/00 (2013.01)

(52) U.S. Cl.
CPC . G06F 9/45558 (2013.01); *G06F 2009/45591* (2013.01)

(58) Field of Classification Search
None
See application file for complete search history.

(56) References Cited

U.S. PATENT DOCUMENTS

2006/0230390 A1\* 10/2006 Alexander, III .... G06F 11/3616
717/130
2009/0248611 A1\* 10/2009 Xu ...................... G06F 9/45533

FOREIGN PATENT DOCUMENTS

| JP | 63-201840 | 8/1988 |
| JP | 10-240581 | 9/1998 |
| JP | 2005-352669 | 12/2005 |
| WO | 2009/147738 A1 | 12/2009 |

OTHER PUBLICATIONS

Patent Abstracts of Japan, Publication No. 63-201840 Published Aug. 19, 1988.
(Continued)

*Primary Examiner* — Lewis A Bullock, Jr.
*Assistant Examiner* — Melissa Alfred
(74) *Attorney, Agent, or Firm* — Staas & Halsey LLP

(57) ABSTRACT

A virtual computer system including multiple virtual machines operating on a hypervisor, includes a trace information collecting section in the hypervisor configured to collect trace information including an operational state of a process on a first virtual machine of the multiple virtual machines from a context saving area corresponding to the first virtual machine, the process being executed when an interrupt is generated; multiple symbol map information collecting sections in the virtual machines, respectively, configured to collect symbol map information for identifying a process operating on each of the virtual machines from a management area included in each of the virtual machines to send the collected symbol map information to the hypervisor; and an analysis processing section in the hypervisor configured to associate the trace information with the symbol map information for each of the processes.

4 Claims, 15 Drawing Sheets

(56) References Cited

OTHER PUBLICATIONS

Patent Abstracts of Japan, Publication No. 2005-352669, Published Dec. 22, 2005.
Patent Abstracts of Japan, Publication No. 10-240581, Published Sep. 11, 1998.
Yamamura et al., "System Analysis Method by Statistical Analysis on Time-series Data for a PC Cluster System", Symposium on Advanced Computing Systems and Infrastructures, vol. 2006, No. 5, SACSIS2006, Proceedings, Information Processing Society of Japan, May 22, 2006, pp. 437-445.
Japanese Office Action dated Aug. 9, 2016 in corresponding Japanese Patent Application No. 2013-043158.

* cited by examiner

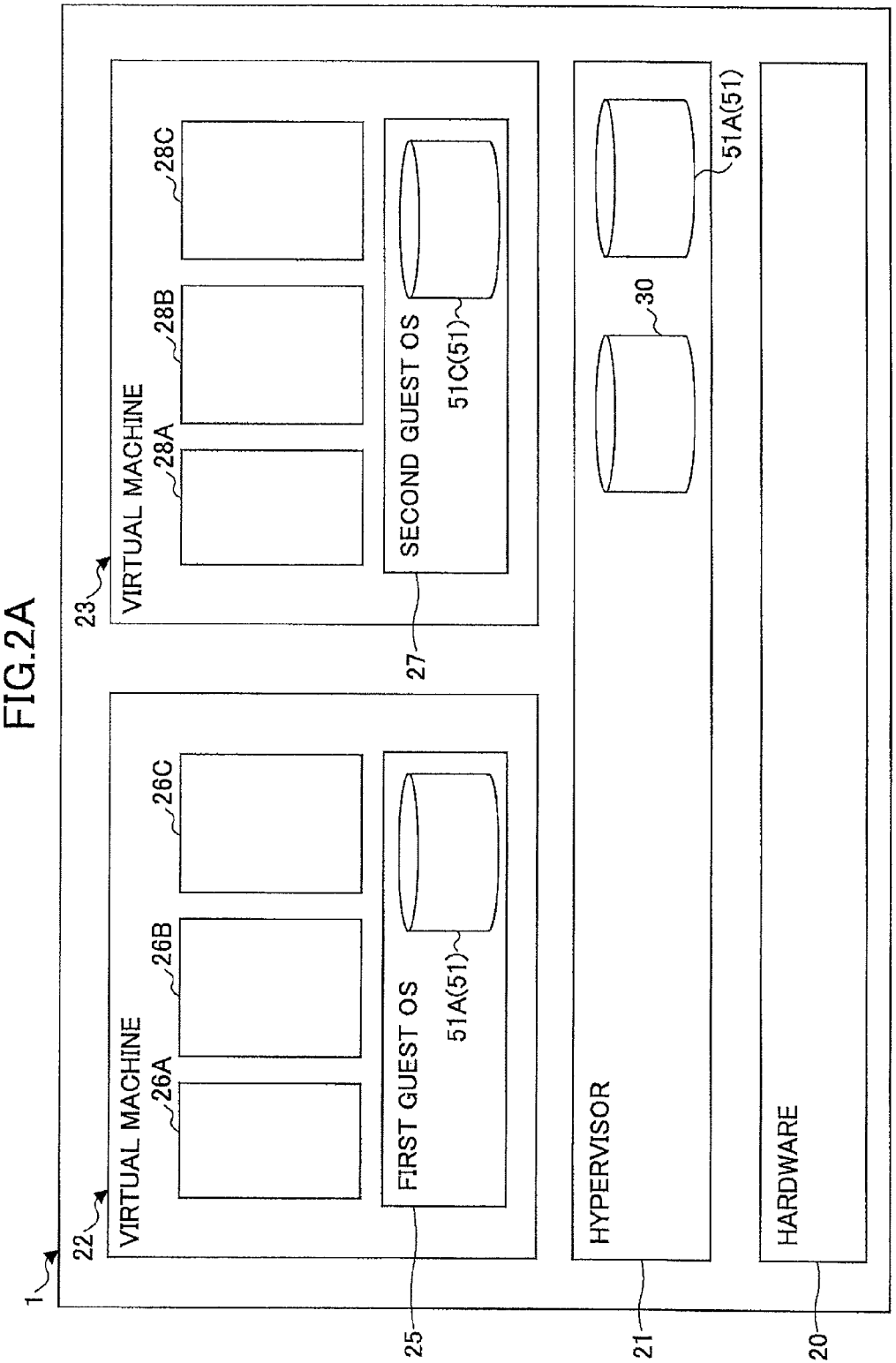

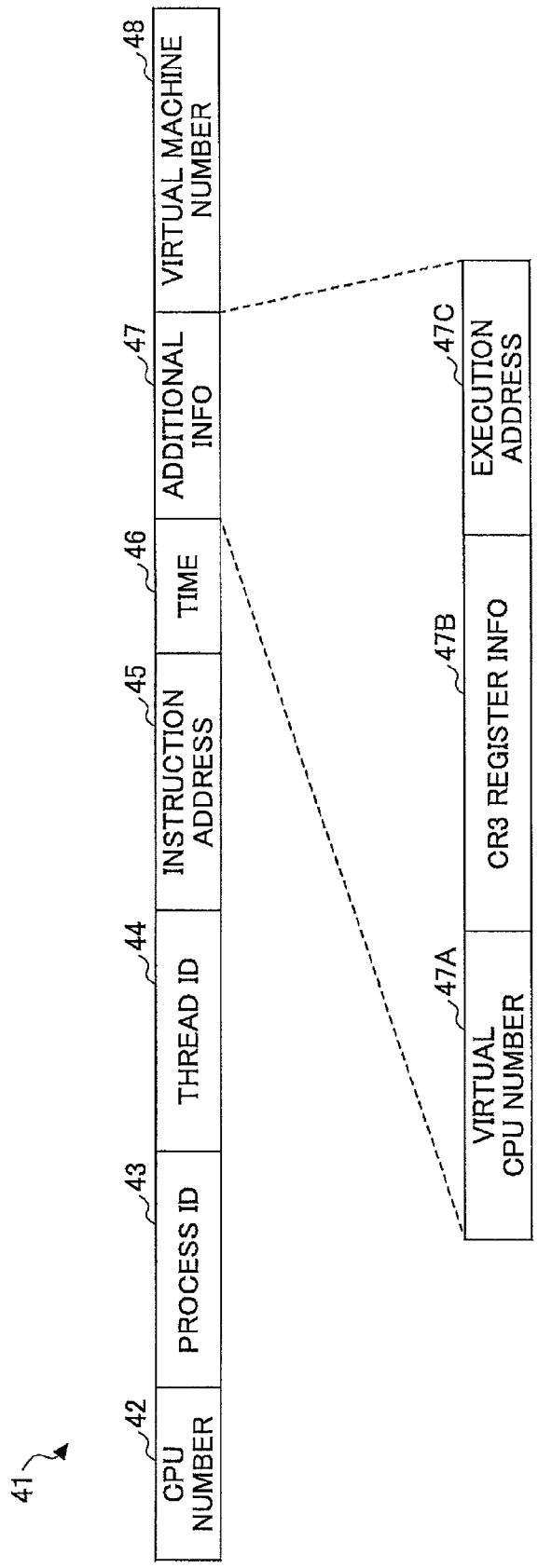

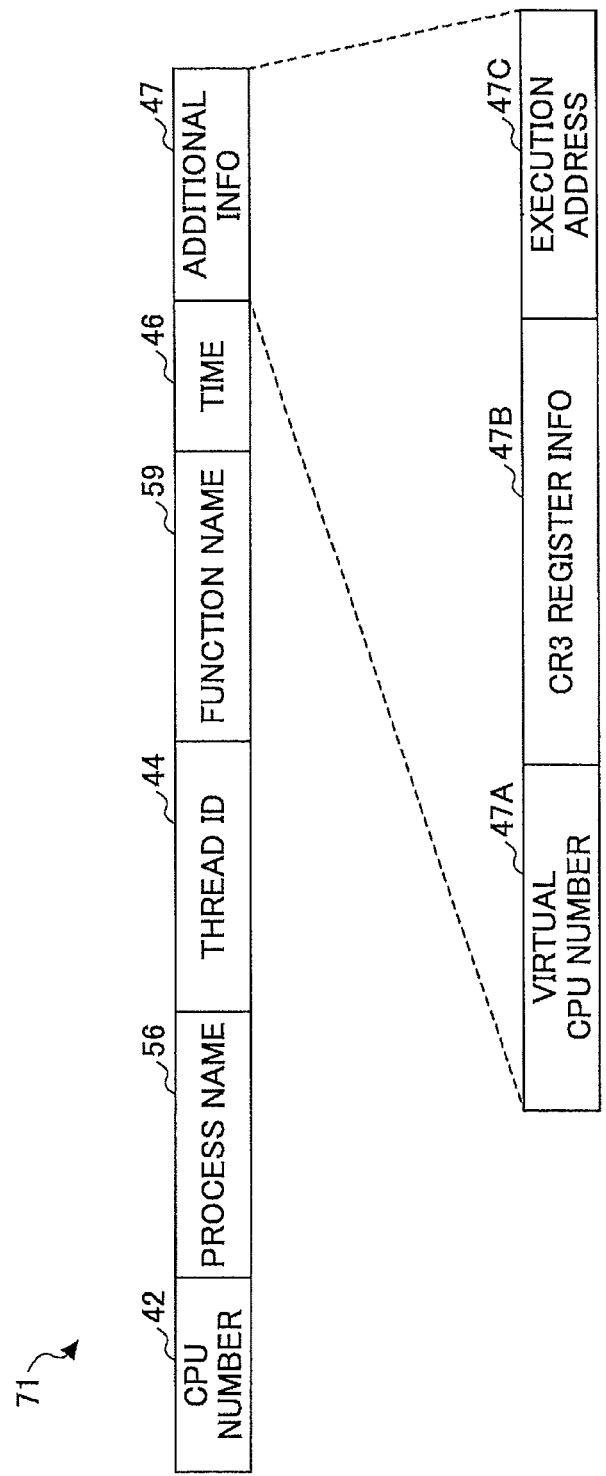

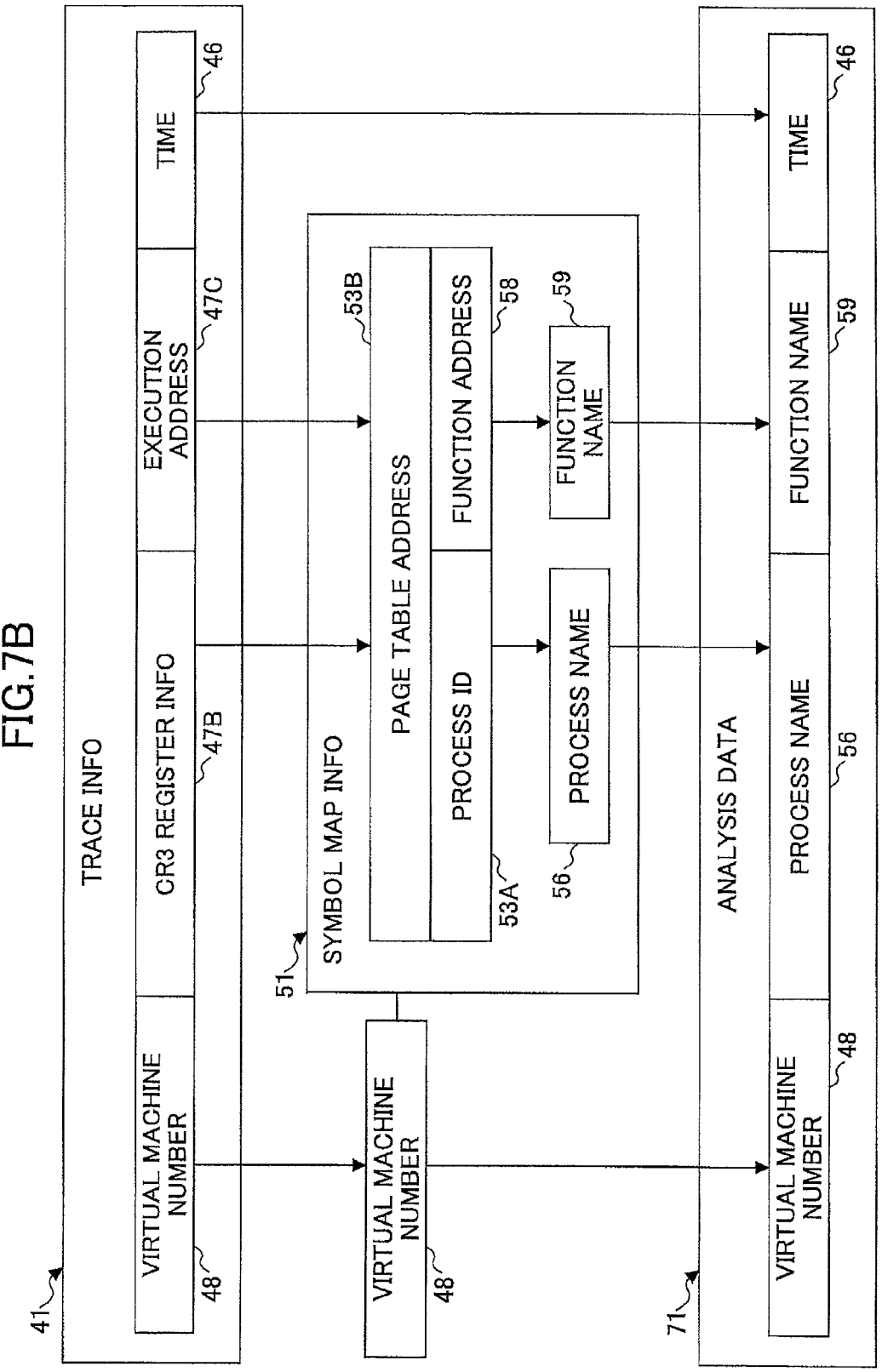

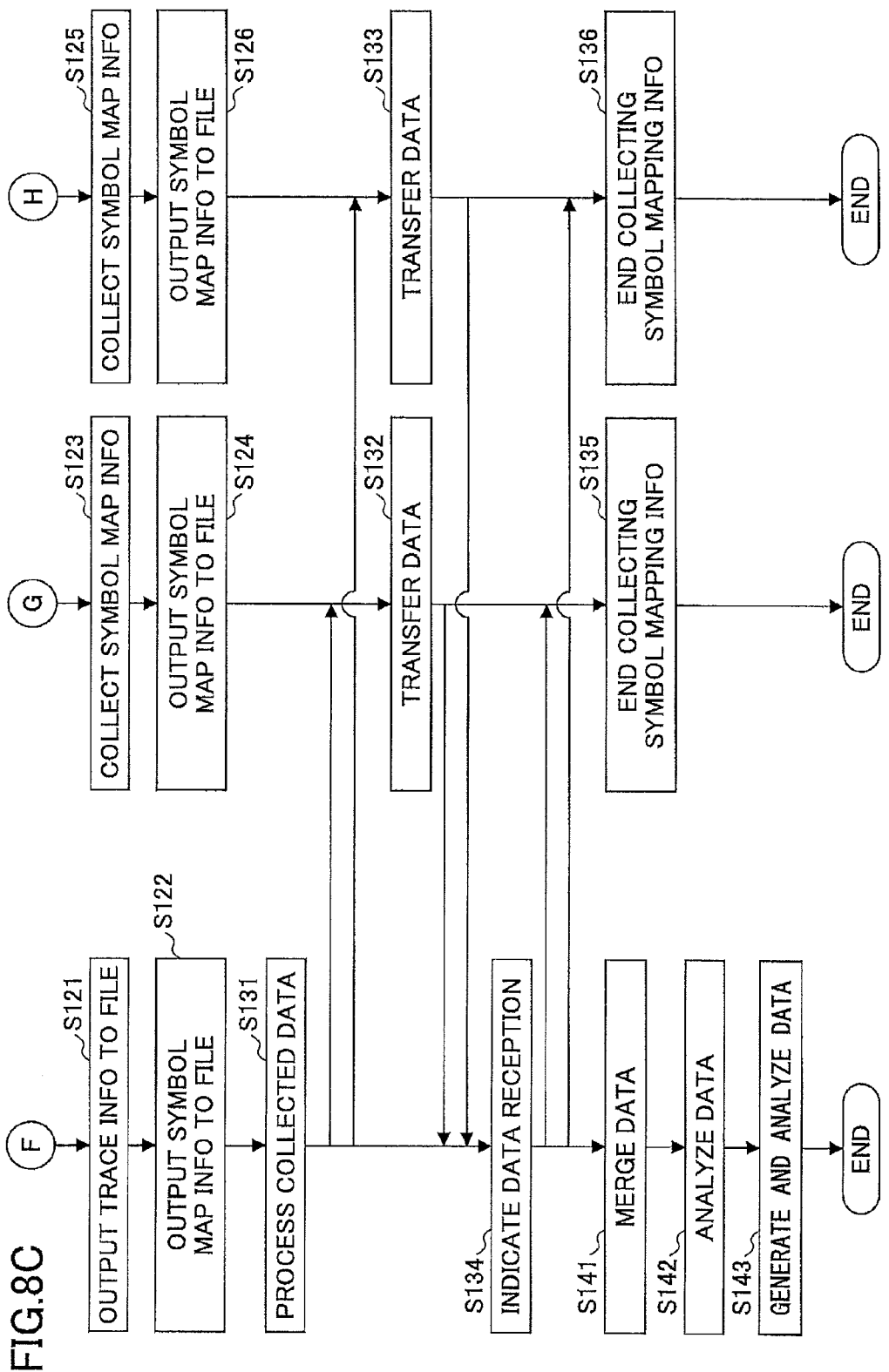

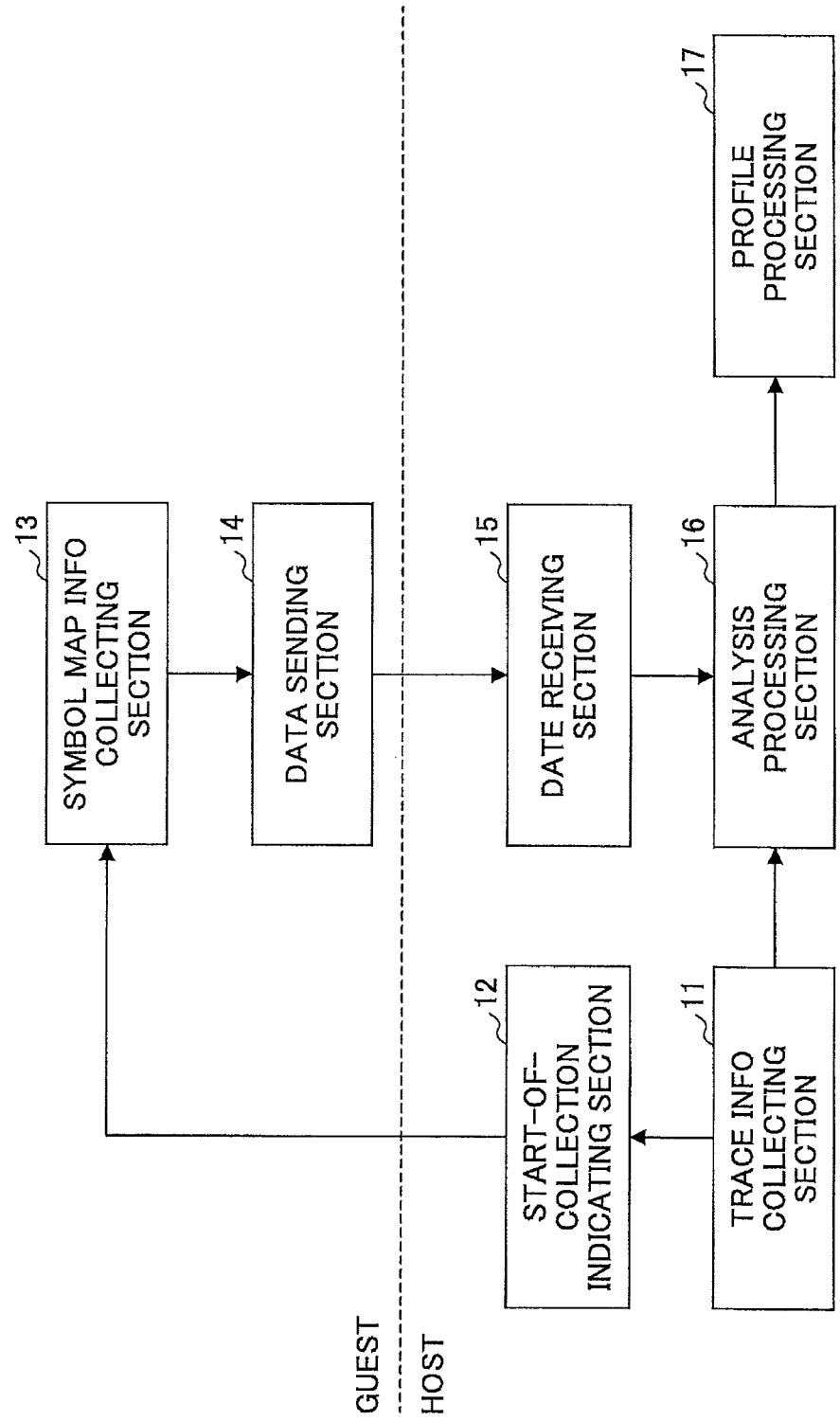

MANAGING VIRTUAL MACHINES USING TRACING INFORMATION

CROSS-REFERENCE TO RELATED APPLICATIONS

This application is based upon and claims the benefit of priority of the prior Japanese Priority Application No. 2013-043158 filed on Mar. 5, 2013, the entire contents of which are hereby incorporated by reference.

FIELD

The disclosures herein generally relate to a virtual computer system and a management method thereof.

BACKGROUND

In recent years, systems have been developed that provide services for users by making a server apparatus operate in a virtual environment to serve as multiple virtual machines (VMs). In such services, a server apparatus has one or more virtual machines operate on it, and each of the virtual machines runs an independent OS (Operating System) to operate application programs.

As a method of making a server apparatus operate in a virtual environment, there is a method that uses software called a "hypervisor" for executing multiple OSes in parallel. In this case, the hypervisor controls virtual machines, and manages the amounts of CPU (Central Processing Unit) resources allocated to the virtual machines.

When operating a server apparatus in a virtual environment, it is necessary to monitor overhead of virtualization by calculating a load of the system with multiple virtual machines. Overhead includes the load of the system itself and protocol processing, overall system load depending on individual performance including processing capability of hardware such as a server apparatus and a network device and system software such as an OS, and the like, which is load that weighs on the server apparatus other than intrinsic processing for services. If overhead is generated, for example, processing throughput drops and a response to a user operation slows down.

Therefore, a server apparatus providing a virtual environment needs a mechanism to monitor overhead. In this case, if a processing flow in a server apparatus can be visualized, overhead monitoring becomes easy.

Here, to visualize a processing flow in a server apparatus, it is necessary to identify an instruction under execution by a hypervisor or a virtual machine. For example, in case where multiple application programs are running on a single OS, it is necessary to identify which application program is being executed at the moment. A conventional method used for the case obtains trace information that summarizes instructions and instruction addresses executed by each application program in a chronological order. In this case, a space ID (Identification) is appended to the trace information that identifies a memory space where instructions in the trace information are executed. In addition, a program map is generated that includes a program name and a start address for each space ID. By associating trace information with program map information by the space ID, a program name currently executing instructions can be identified. In this way, it is possible to examine processing content and an execution time for each application program.

RELATED-ART DOCUMENTS

Patent Documents

[Patent Document 1] Japanese Laid-open Patent Publication No. 63-201840

It is noted that when analyzing operations of multiple virtual machines in a virtual computer system, processing time and the like need to be evaluated by collecting execution times of processes and the like executed by each of the virtual machines and a hypervisor. However, there is a moment when a process on a virtual machine cannot actually operate on a physical CPU, during which an execution control right is transferred to the hypervisor or another virtual machine. In this case, a time obtained on the virtual machine may be delayed later than the actual time, with which an execution time of a process or the like executed on the virtual machine cannot be accurately collected. It may be possible to accurately grasp an execution time of a process on such a virtual machine by having a hypervisor execute a virtual interruption for the virtual machine, collecting information about the program on the virtual machine, and collecting the execution time of a process of the program on the virtual machine along a time axis of the hypervisor, which can be applied to all the virtual machines in a unified way. However, additional overhead of virtual interrupts is required, which makes executions of the processes complicated and raises processing costs.

Also, it is easy for a hypervisor to identify an instruction in a process in the hypervisor or an instruction output to a virtual machine because the hypervisor operates in an environment provided for a server apparatus. On the other hand, application programs running on virtual machines differ from each other depending on users. Moreover, from a security viewpoint, details of processing content on a virtual machine may not be identified by the hypervisor. Therefore, in such a conventional virtual computer system, it is not easy for a system administrator to grasp processing content or a processing flow in a virtual machine.

SUMMARY

According to at least one embodiment of the present invention, a virtual computer system including multiple virtual machines operating on a hypervisor, includes: a trace information collecting section in the hypervisor configured to collect trace information including an operational state of a process on a first virtual machine of the multiple virtual machines from a context saving area corresponding to the first virtual machine, the process being executed when an interrupt is generated; multiple symbol map information collecting sections in the virtual machines, respectively, configured to collect symbol map information for identifying a process operating on each of the virtual machines from a management area included in each of the virtual machines to send the collected symbol map information to the hypervisor; and an analysis processing section in the hypervisor configured to associate the trace information with the symbol map information for each of the processes.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 2A is a block diagram illustrating an example of a software configuration of a virtual computer system according to an embodiment of the present invention;

FIG. 4A is a schematic view illustrating an example of trace information in a virtual computer system according to an embodiment of the present invention;

FIG. 7A is a schematic view illustrating an example of analysis data in a virtual computer system according to an embodiment of the present invention;

FIG. 7B is a schematic view illustrating steps for creating analysis data in a virtual computer system according to an embodiment of the present invention;

FIG. 8C is a third flowchart that is a continuation of the second flowchart in FIG. 8B; and FIG. 9 is a functional block diagram illustrating a virtual computer system according to a second embodiment of the present invention.

DESCRIPTION OF EMBODIMENTS

According to at least one embodiment of the present invention, processing on a virtual machine can be analyzed at a function level based on information obtained by a hypervisor, which makes it easy to grasp a processing flow that may lead to improvement of maintainability and performance optimization. In addition, it is expected that resources can be used more efficiently.

First Embodiment

Figure 1:
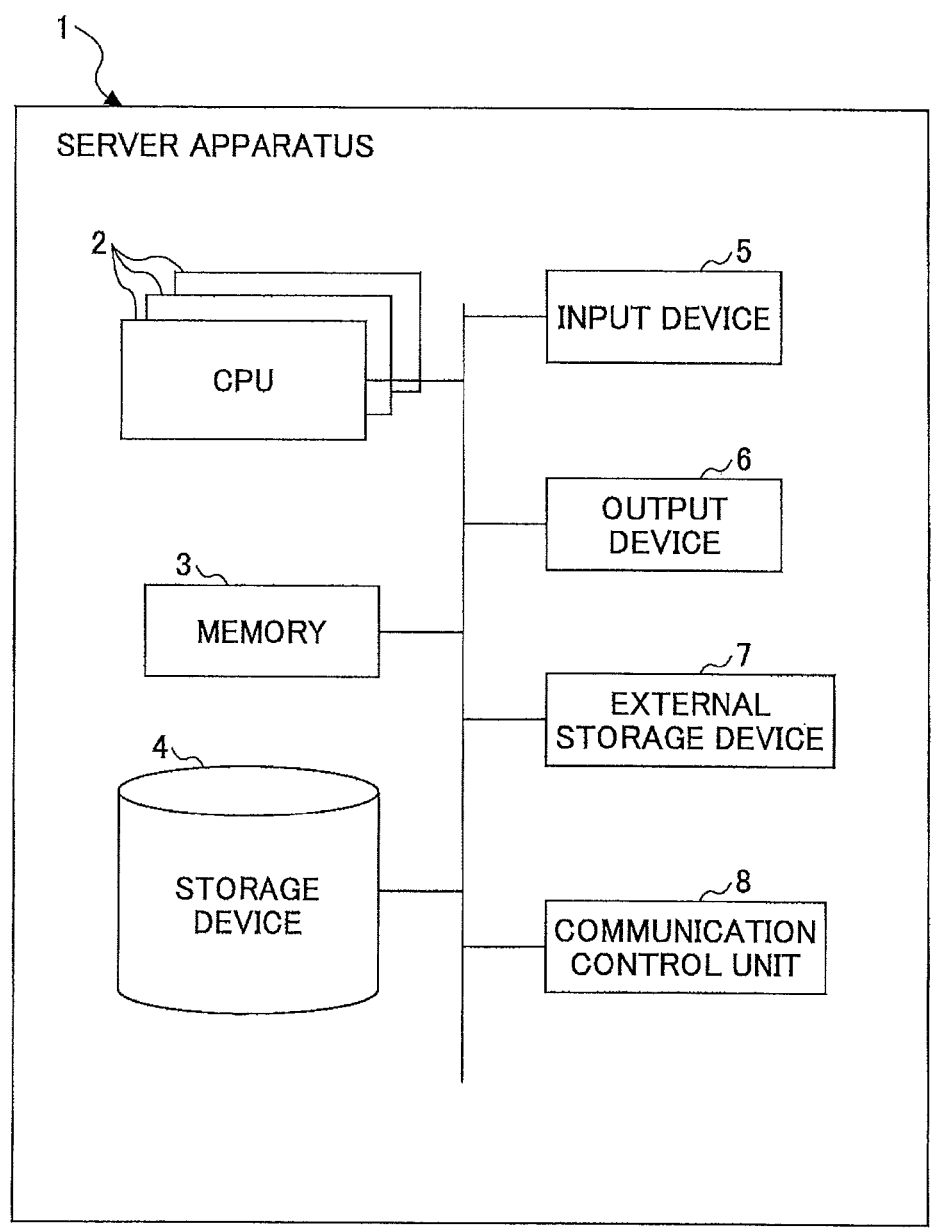
FIG. 1 is a block diagram illustrating an example of a hardware configuration of a virtual computer system according to an embodiment of the present invention.

In the following, a first embodiment of the present invention will be described in detail with reference to the drawings. FIG. 1 illustrates a general configuration of a server apparatus 1 that functions as a virtual computer system according to the present embodiment. The server apparatus 1 includes multiple CPUs 2, a memory 3, a storage device 4, an input device 5, an output device 6, an external storage device 7, and a communication control unit 8 that are connected with each other by a bus, which forms hardware of the server apparatus 1. A hypervisor (a virtualization layer) is executed, which provides a virtual environment, by having the CPUs 2 included in the hardware execute a predetermined program loaded in the memory 3. Here, the hypervisor operates as application software on an OS, which is virtualization software that enables a guest OS to operate on it, also called a "virtualization monitor", or a "virtualization OS".

The CPUs 2 implement various functions by reading programs and data from the storage device 4 to the memory 3 to execute them. Although three CPUs 2 are provided according to the present embodiment, the number of CPUs may be one, two, or more than three. For example, the three CPUs 2 illustrated in FIG. 1 are assigned with CPU numbers, respectively, to identify which CPU 2 executes which process.

Also, each of the CPUs 2 includes a performance counter for counting hardware related events and storing the count. The performance counter is used for checking a general system status, and comparing it with a performance criterion, which can obtain the number of events per second. Therefore, by using the function of the performance counter, it is possible to measure processing time in the server apparatus 1 with units of ms to µs. According to the present embodiment, by measuring time using a sampling profiler method with the performance counters of the CPUs 2, it is possible to avoid software overhead and to obtain correct data independent of software load.

The memory 3 includes a ROM (Read-Only Memory), a RAM (Random Access Memory) and the like, in which data and application programs are stored or temporarily stored. In the storage device 4, the operating system (OS) of the server apparatus 1 and various application programs are stored. The input device 5 includes a keyboard, a mouse and the like, which are used for receiving data as input from a system administrator. The input device 5 may be a touch-panel display. The output device 6 includes a display, a printer, and the like. The external storage device 7 is a device to read/write data on an external recording medium (not illustrated). By reading applications and data stored in an external recording medium with the external storage device 7, it is possible to install them into the storage device 4 and to execute them by the CPU 2.

The communication control unit 8 controls communication with other terminals via a network. Also, it is possible to download an application program via the network to install it into the storage device 4. The network may be configured using a dedicated network or a public network.

Here, the communication control unit 8 and the external storage device 7 function also as input devices to input data into the server apparatus 1. Also, the input device 5, the output device 6, and the external storage device 7 are not mandatory configuration elements in the present embodiment. Also, the server apparatus 1 may include devices other than the configuration elements illustrated in FIG. 1.

Next, with reference to FIG. 2A, a hypervisor 21 will be described that is used for building a virtual environment on the server apparatus 1. FIG. 2A schematically illustrates, as an example, a software configuration of an application-type virtual environment. The hypervisor 21 controls a virtual computer system as a whole that is implemented by the hardware 20 of the server apparatus 1, which is an application program provided by a system administrator. For example, the hypervisor 21 provides a first virtual machine (VM) 22 and a second virtual machine 23. The number of virtual machines may be one or more than two. Here, the virtual machines 22-23 may be called "guests".

The multiple virtual machines 22-23 working on the hypervisor 21 operate on OSes (guest OSes) 25 and 27, respectively. For example, the first virtual machine 22 runs one or more application programs 26A, 26B, and 26C on the first guest OS 25. Similarly, the second virtual machine 23 runs one or more application programs 28A, 28B, and 28C on the second guest OS 27. Here, the application programs 26A-26C and 28A-28C are provided by users who use the virtual machines 22-23, which may be, for example, database software, a monitoring program that monitors a process executed on a virtual machine, and the like.

The hypervisor 21 executes dispatch processing of the guest OSes 25 and 27, emulation of privileged instructions executed by the guest OSes 25 and 27, and control of the hardware 20. A hypervisor-type virtualization application such as the hypervisor 21 directly executes control of the hardware 20, which has an advantage of quick processing responses.

Figure 2B:
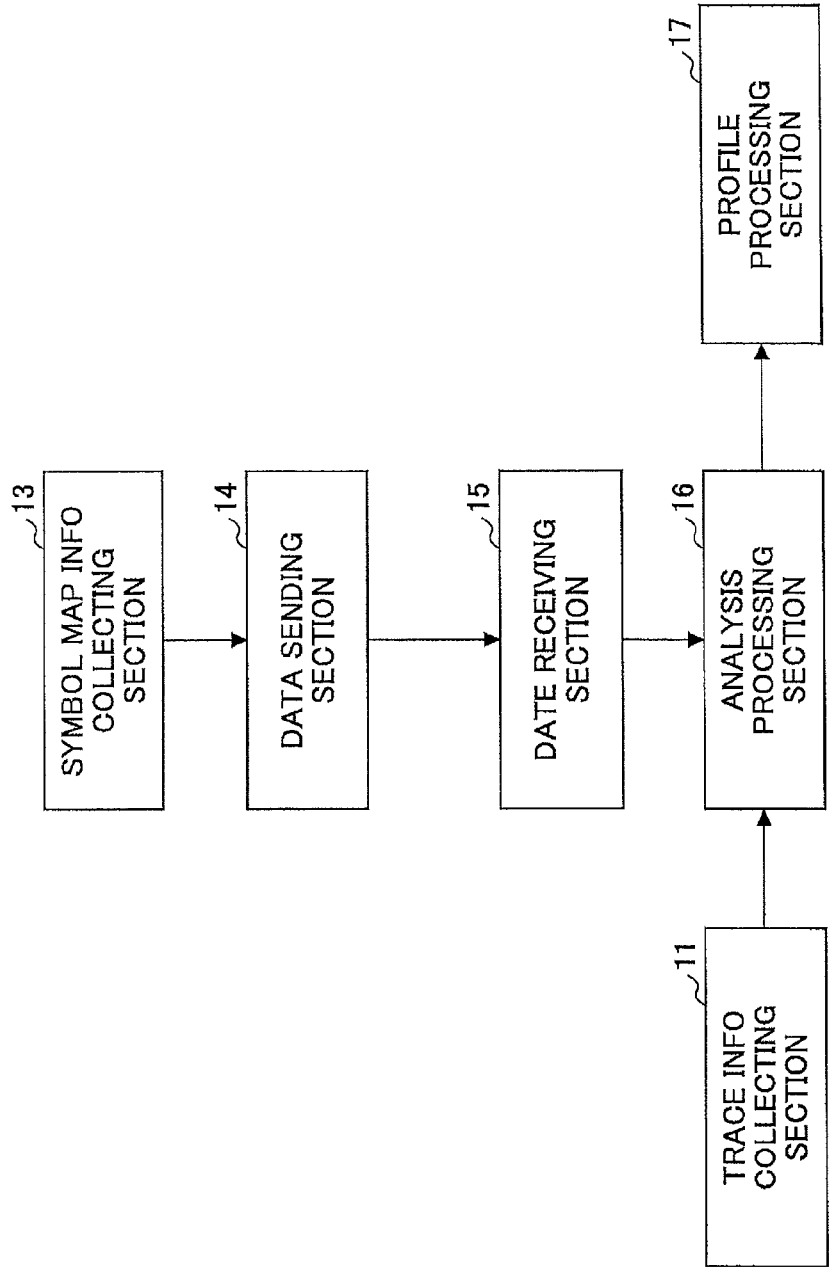
FIG. 2B is a functional block diagram illustrating a virtual computer system according to an embodiment of the present invention.

Also, functions of the virtual computer system will be described with reference to FIG. 2B. The server apparatus 1 implementing the virtual computer system may be functionally partitioned into a trace information collecting section 11, a symbol map information collecting section 13, a data sending section 14, a data receiving section 15, an analysis processing section 16, and a profile processing section 17. The trace information collecting section 11 collects trace information. The trace information includes a virtual machine number for identifying a process that operates on the virtual machine 22 or 23 when a sampling interrupt is generated, an execution address value and a page table address value of the virtual machine 22 or 23, and an execution time of the process. The execution address value and the page table address value are collected from a context saving area.

The symbol map information collecting section 13 collects symbol map information. The symbol map information includes information for identifying a process running on the virtual machine 22 or 23, and information for identifying a function executed in the process. The data sending section 14 sends the symbol map information to the data receiving section 15. The data receiving section 15 receives the symbol map information, assigns identification information of the corresponding virtual machine 22 or 23 to the symbol map information, and stores it.

The analysis processing section 16 associates the trace information with the symbol map information, converts the page table address value in the trace information into identification information of the process, and creates analysis data. The analysis data includes information that identifies the virtual machine 22 or 23, information that identifies a process in the virtual machine 22 or 23, information that identifies a function, and information about the execution time of the process. The profile processing section 17 uses third process information to execute an existing profile procedure. The existing profile procedure includes data processing to grasp time required for executing a process or a function.

Here, the server apparatus 1 uses, for example, a processor made by Intel Corp. as the CPU 2, on which a program called "VMM (Virtual Machine Monitor)" is run to operate the virtual machines 22-23 on VMM according to the present embodiment. In the virtual computer system like this, for example, the virtual machines 22-23 and the hypervisor 21 may access a single physical resource due to execution scheduling of the virtual machines 22-23, or during the course of processing on the virtual machines 22-23 and the hypervisor 21. In this case, content of the allocated physical resource is saved into and restored from the context saving area to guarantee the continuation of a process on the virtual machine 22 or 23.

Therefore, the CPU 2 has the context saving area and a control register for controlling the context saving area. For example, a processor made by Intel Corp. has control registers CR0-CR4. Among them, the CR3 register points the physical address of a page directory, which includes address area information called "page table address". Every time a user process to be executed is switched, the CR3 register is rewritten to specify an extended page table for the process. When an interrupt is generated, the value of the CR3 register of the virtual machine 22 or 23 under execution is saved into the context saving area. When resuming the interrupted process on the virtual machine 22 or 23 after the interrupt has been processed, the value of the CR3 register in the context saving area is reloaded to resume the process. Therefore, by referring to the CR3 register, it is possible to identify a process.

Moreover, the CPU 2 has a program counter (EIP), or an instruction pointer, as one of its registers. The program counter temporarily stores an address of the memory 3 that stores an instruction to be executed next. When an instruction is read out from the memory 3, the value in the program counter is increased to point to an address that stores an instruction to be executed next. Therefore, by referring to the program counter, it is possible to obtain the address of an instruction.

Also, the CPU 2 has a page table structure called an "extended page table (EPT)" for controlling VMM. The extended page table is provided for reducing overhead of page table management of VMM by supporting conversion from a physical address in the virtual machine 22 or 23 to a physical address space (final physical address) of VMM.

According to the present embodiment, the CPU 2 executes processing for the hypervisor 21 in a root mode (kernel mode), and transitions to a non-root mode (user mode) to execute processing for the virtual machines 22-23. For example, a transition from the root mode to the non-root mode is called a "VM-entry", and the reverse transition is called a "VM-exit". In this case, the hypervisor 21 transfers control to the virtual machine 22 or 23 upon a "VM-entry" instruction.

For example, when VMM starts up the virtual machine 22 or 23, the operation mode of the CPU 2 is transitioned from the root mode to the non-root mode, and when the virtual machine 22 or 23 ends its operation, it is transitioned from the non-root mode to the root mode. A transition from the non-root mode to the root mode also takes place when a predetermined instruction is executed in the virtual machine 22 or 23.

For executing various processing while switching back and forth between the root mode and the non-root mode, a virtual machine control structure (VMCS) is created in the server apparatus 1 for storing a state of the CPU 2 and for controlling transitions between the modes.

Figure 3:
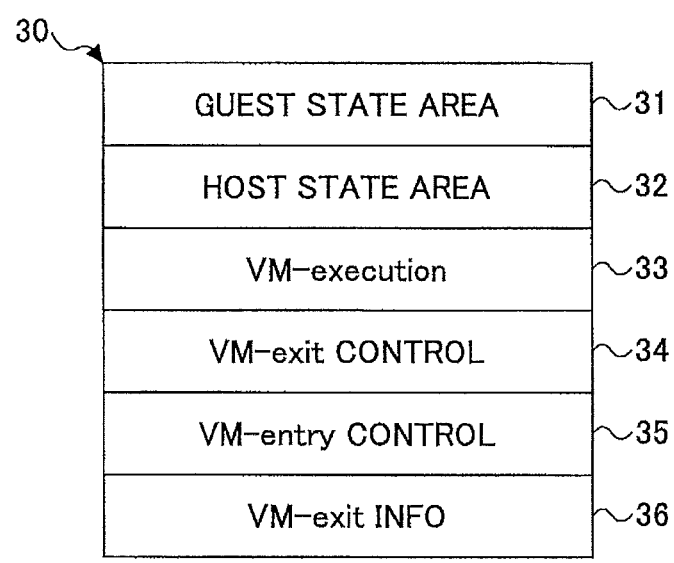
FIG. 3 is a schematic view illustrating an example of a virtual machine control structure of a virtual computer system according to an embodiment of the present invention.

As illustrated in FIG. 3, the virtual machine control structure 30 is defined with six areas, for example. The six areas include a guest state area 31, a host state area 32, a VM-execution control field 33, a VM-exit control field 34, a VM-entry control field 35, and a VM-exit information field 36. Data in these six areas is saved into or restored from the memory 3 to enable switching between the operation modes.

Here, the guest state area 31 stores a value of the CR3 register, which is a control register of the CPU 2 running the virtual machine 22 or 23, and also stores a part of other registers. By obtaining data in the guest state area 31, various register values of the CPU 2 can be obtained. The host state area 32 stores values of registers of the CPU 2 for the virtual machine 22 or 23. The VM-execution control field 33 controls behavior of the CPU 2 in the non-root mode. The VM-exit control field 34 controls behavior of the CPU 2 in the root mode. The VM-exit information field 35 stores information of a VM-exit generated last.

Here, the CPU 2 is not limited to the one made by Intel Corp., but may be a product of other manufacturers, for example, AMD, Inc. In this case, a structure corresponding to the virtual machine control structure changes depending on a product used for the CPU 2. For example, with a processor made by AMD, Inc., a virtual machine control structure is called a "VMCB (Virtual Machine Control Block)".

Next, an example of trace information 41 (second information) obtained from the program counter and the CR3 register illustrated in FIG. 4A. Trace information 41 is formed by obtaining data in a virtual machine control structure 30 from the memory 3, especially, the guest state area 31. Here, trace information 41 is obtained in real time by executing a sampling interrupt with an interval of 1 ms to 1 μs using the performance counter of the CPU 2. Trace information 41 is collected in real time because it is necessary to correctly grasp an execution time of a process identified with an instruction address in the server apparatus 1.

Trace information 41 includes a list of records arranged in a chronological order, and each record in the list includes, as illustrated in FIG. 4A, a CPU number 42, a process ID 43, a thread ID 44, an instruction address (IP) 45, time data 46 indicating time when a process identified by the instruction address has been executed, additional information 47 about an execution on the virtual machine 22 or 23, and the record is created associating with a virtual machine number 48 (an identification number of the virtual machine 22 or 23). The CPU number 42 is information to identify one of the CPUs 2. The process ID 43 is information to identify an address of the extended page table, which can be obtained from the virtual machine control structure 30. The thread ID 44 is information assigned to each thread. The instruction address 45 is information to identify an instruction address to be executed, which can be obtained from the virtual machine control structure 30. The time data 46 indicates a timing when data is obtained using the performance counter.

The additional information 47 is not used in the root mode, but appended only in the non-root mode. The additional information 47 may include, for example, a virtual CPU number 47A, CR3 register information 47B (page table address value), and an execution address 47C (instruction address), arranged in this order. The virtual CPU number 47A, the CR3 register information 47B, and the execution address 47C are collected by the trace information collecting section 11 from the context saving area of an interrupt source of a sampling interrupt, and is obtained, for example, by referring to values in the CR3 register in the guest state area 31 in the virtual machine control structure 30 in FIG. 3 and the program counter.

Figure 4B:
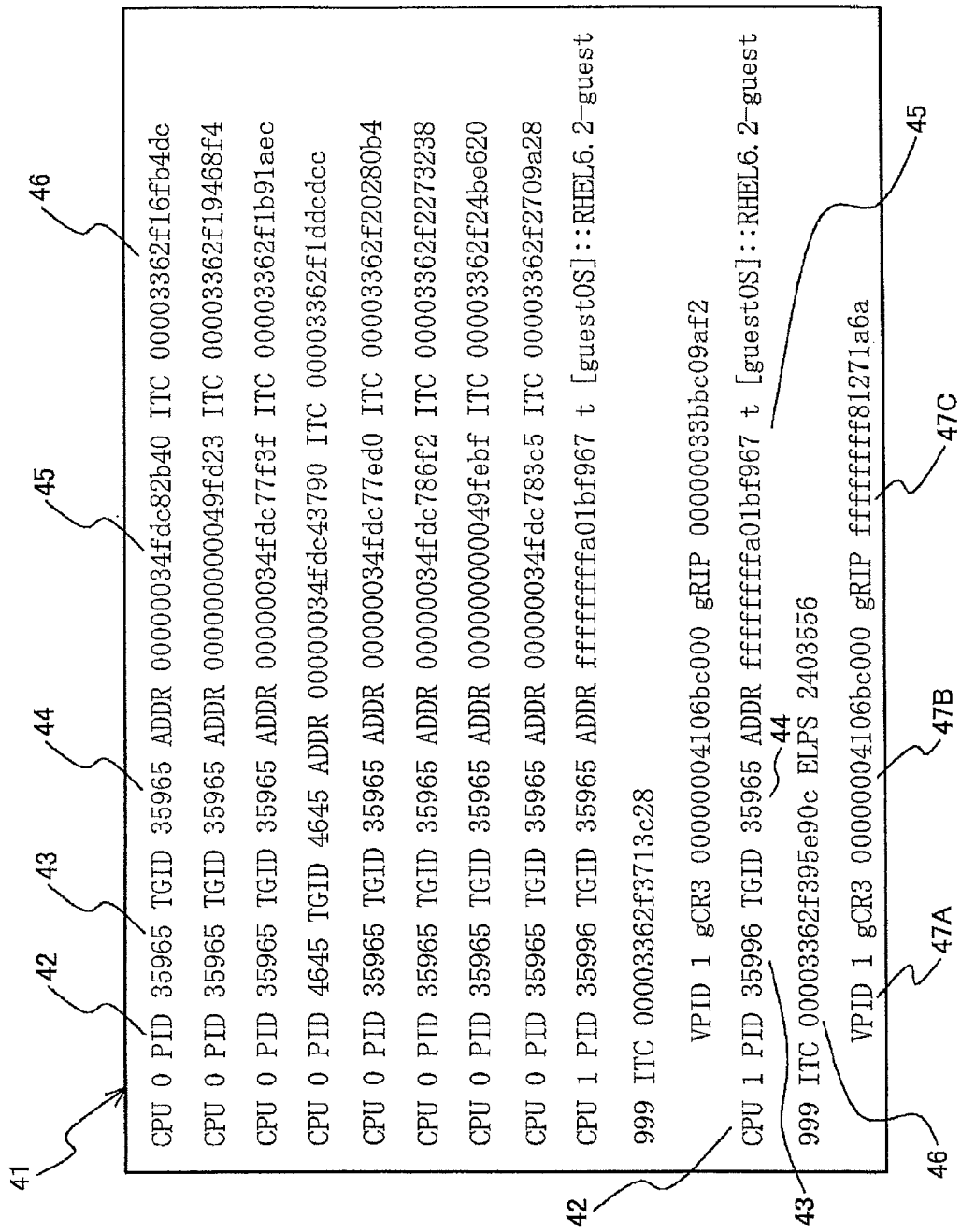
FIG. 4B is a schematic view illustrating a concrete example of trace information in a virtual computer system according to an embodiment of the present invention.

Next, a concrete example of trace information 41 is illustrated in FIG. 4B. The first record in the trace information 41 has the CPU number 42 set to "0". This value corresponds to the number assigned to a physical CPU 2. The process ID 43 is set to "35965 TGID". The thread ID 44 is set to "35965 ADDR", and the instruction address 45 is set to "00000034fdc82b40". Moreover, "ITC 00003362f16f4dc" is set as the time data 46 that indicates when the data is obtained. The additional information 47 is not appended because the process corresponding to this record is executed by the hypervisor 21.

On the other hand, the ninth and tenth records in the list are appended with the additional information 47 because the processes are executed by the virtual machine 22 or 23. In the tenth record with the CPU number 42 set to "1", the thread ID 44 includes information that indicates the guest OS 25 or 27 is "[guestOS]::RHEL6.2-guest999". Although the information is not a mandatory element in the present embodiment, inclusion of information indicating a guest OS 25 or 27 contributes to visualization of a processing flow in the server apparatus 1.

Moreover, the virtual CPU number 47A in the additional information 47 in the tenth record is set to "VPID 1", which indicates that a virtual CPU provided for a user by the hypervisor 21 has the virtual CPU number of "1". Moreover, the CR3 information 47B is set to "gCR3 00000004106bc000", and the execution address 47C is set to "gRIP ffffffff81271a6a".

Here, a concrete content of processing cannot be identified only with the trace information 41. Therefore, according to the present embodiment, the process ID 43 and the instruction address 45 in the trace information 41 are converted into a process name and a function name of the process, respectively.

Figure 5:
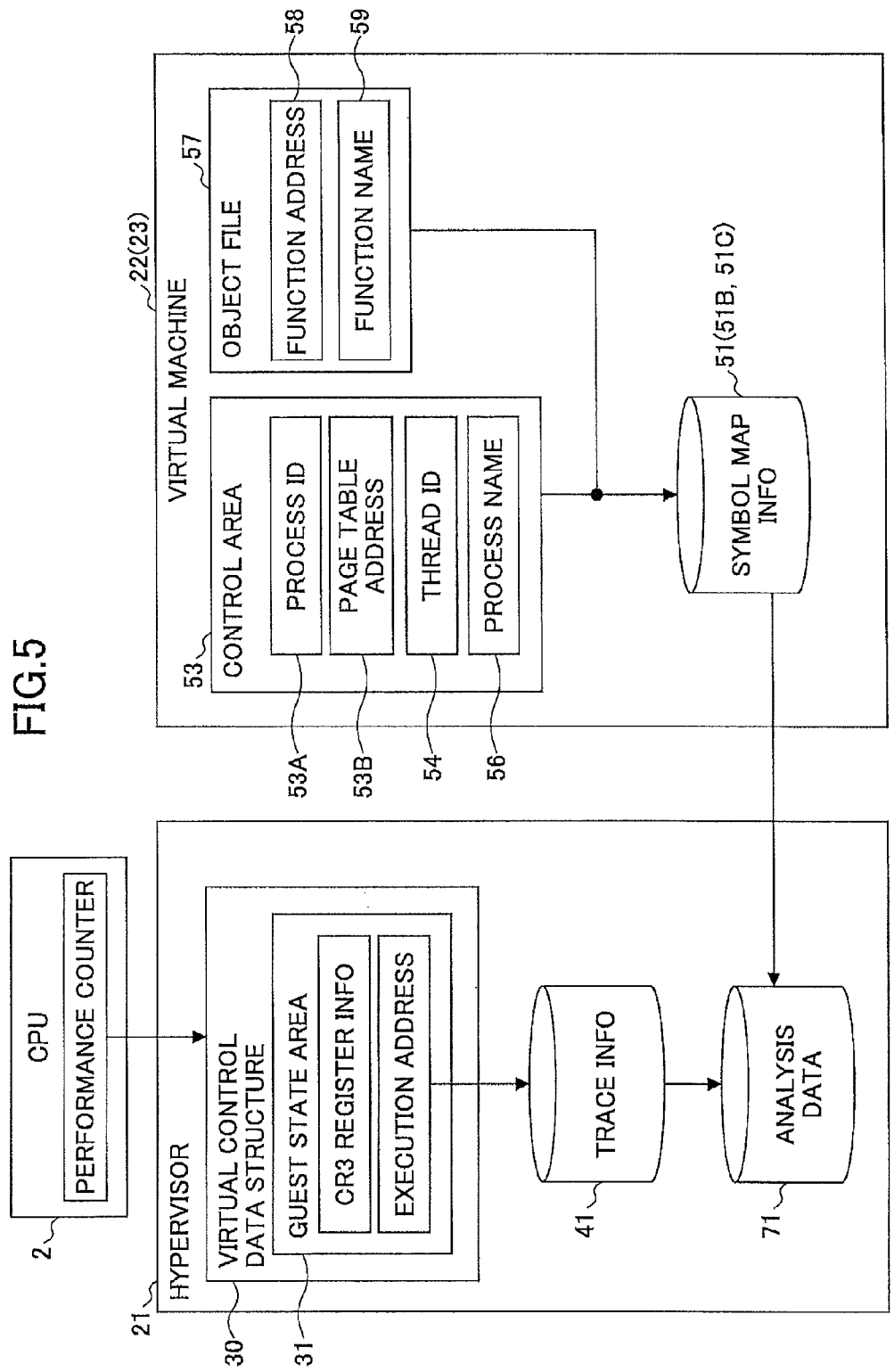
FIG. 5 is a schematic view illustrating an example of a processing flow in a virtual computer system according to an embodiment of the present invention.

Specifically, the symbol map information collecting section 13 of the server apparatus 1 creates symbol map information 51 that includes information about a process name 56 and a process ID 53A executed on the virtual machine 22 or 23, and information about a function used in the process, the function name 59 and the function address 58, as schematically illustrated in FIG. 5. Then, by associating the symbol map information 51 with trace information 41 created on the hypervisor 21 for each process, the analysis data 71 is generated that visualizes a processing flow on the server apparatus.

In the example illustrated in FIG. 5, the symbol map information 51 is created, for example, for a process that is generated by an application 26A executed on the first virtual machine 22. Namely, the symbol map information 51A for the application 26A includes the process name 56 of the process that is generated by the application 26A, the function address 58 that is an execution address of the function, and the function name 59 executed by the process. If multiple processes are running concurrently, information about all processes are collected. For example, the symbol map information 51B for an application 26B is also created.

The symbol map information 51C is also created for a process executed on the second virtual machine 23. As information about a process name and a function name included in symbol map information 51 are not dynamically changed during the execution of a process, it is not necessary to collect the information in real time, but to obtain while the process exists. Therefore, symbol map information 51 may be collected, for example, by a delayed time operation.

Figure 6A:
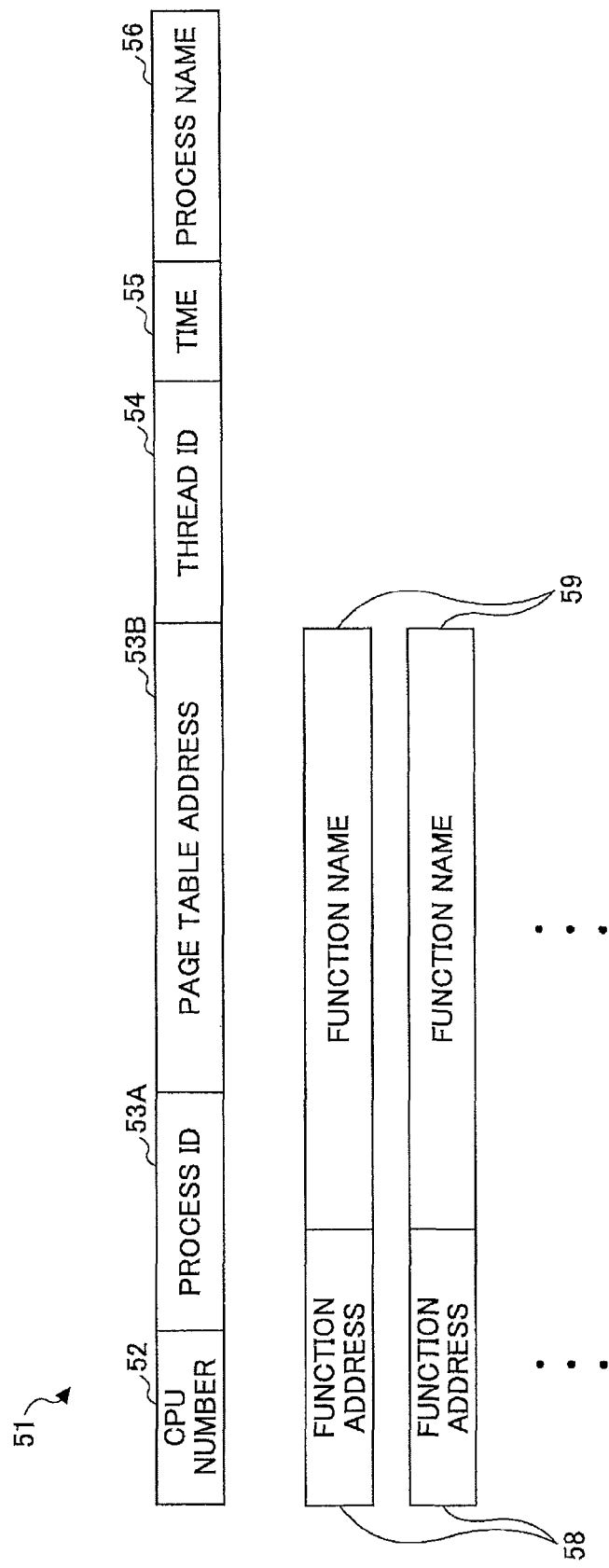
FIG. 6A is a schematic view illustrating an example of symbol map information in a virtual computer system according to an embodiment of the present invention.

As schematically illustrated in FIG. 6A, a record of symbol map information 51 is created for each process that includes a CPU number 52, a process ID 53A, a page table address 53B (address area information), a thread ID 54, a time 55, a process name 56, a function address 58, and a function name 59. The process ID 53A, the page table address 53B, the thread ID 54, and the process name 56 are obtained from a management area 53 (task structure) created for each process in the virtual machine 22 or 23. Also, the function address 58 and the function name 59 are obtained from an object file 57 corresponding to an application 26A.

Figure 6B:
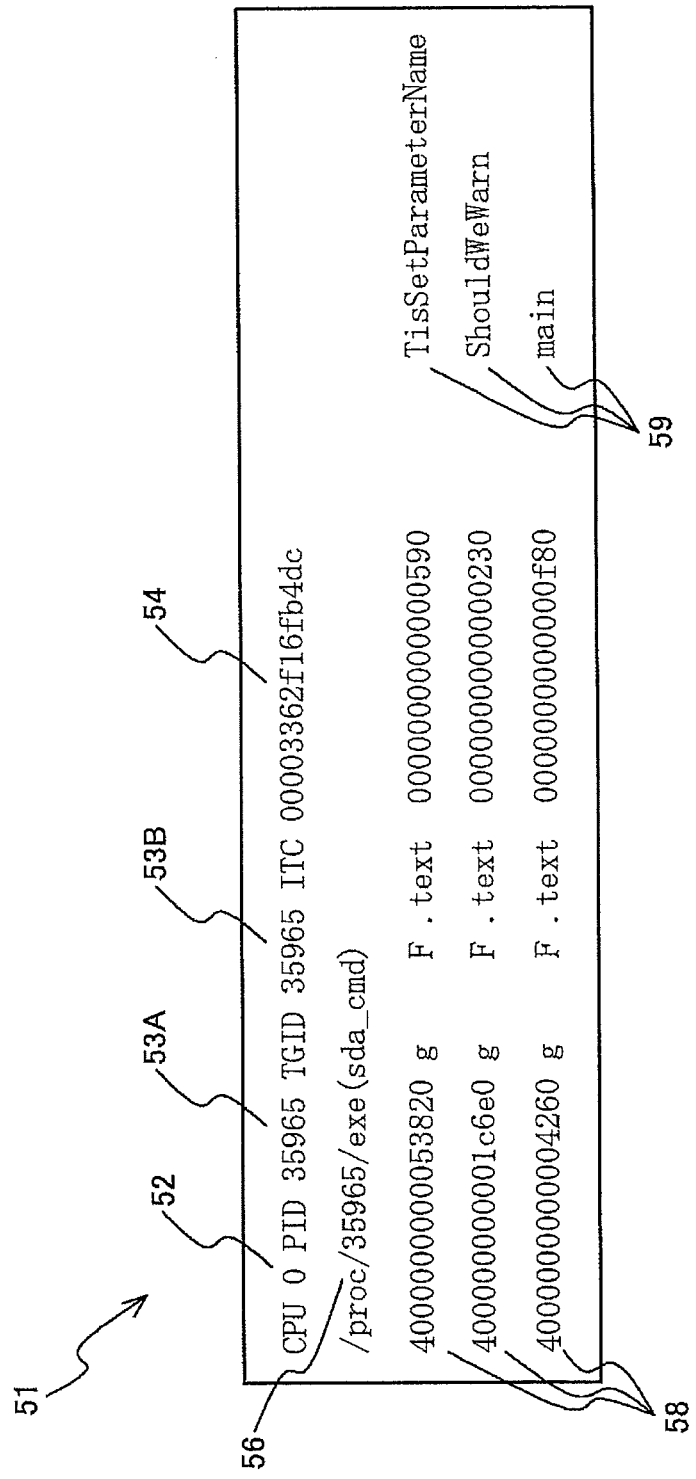
FIG. 6B is a schematic view illustrating a concrete example of symbol map information in a virtual computer system according to an embodiment of the present invention.

Moreover, a concrete example of symbol map information 51 is illustrated in FIG. 6B. In the concrete example, the CPU number 52, or the virtual CPU in this case, is set to "0", and the process name 56 is set to a module name "exe (sda_cmd)". Here, addresses starting from a function address 58 up to the next function address 58 are used by a single function. For example, addresses starting from the function address 58 "4000000000004260" to one address before "400000000001c6e0" are used by a function "main".

Next, with reference to FIG. 7A, analysis data 71 will be described that is created by associating trace information 41 with symbol map information 51. Information about the same virtual machine number 48 included in both of the trace information 41 and the symbol map information 51 is combined and analyzed. The virtual machine number 48 in the symbol map information 51 is set after information collection.

Analysis data 71 in the root mode state includes a CPU number 42, a process name 56, a thread ID 44, a function name 59, time data 46, and additional information 47 if the process runs on the virtual machine 22 or 23. The additional information 47 includes a virtual CPU number 47A, CR3 register information 47B, and an execution address 47C. Namely, according to the present embodiment, the analysis data 71 is formed by converting a process ID 43 and an instruction address 45 in FIG. 4A into a process name 56 and a function name 59 in FIG. 6A. Here, the analysis data 71 may not include the additional information 47.

Here, as illustrated in FIG. 7B, a process name 56 in the analysis data 71 is created by associating additional information 47 in the trace information 41 with address area information in the symbol map information 51 for each process. Specifically, a process ID 53A is identified by searching for a page table address 53B in the symbol map information 51 using CR3 register information 47B in the additional information 47 in the trace information 41, to obtain a process name 56 allocated to the process ID 53A.

Also, a function name 59 in the analysis data 71 is created by associating address area information in the trace information 41 with address area information in the symbol map information 51 for each process. Namely, the analysis processing section 16 associates address area information in the trace information 41 with address area information in the symbol map information 51, and also associates an execution address 47C in the trace information 41 with a function address 58 and a function name 59 in the symbol map information 51. Specifically, a function address 58 is identified by searching for a page table address 53B in the symbol map information 51 using an execution address 47C included in additional information 47 in the trace information 41, to obtain a function name 59 allocated to an area of a function address 58 that includes an execution address 47C.

Moreover, the analysis data 71 is attached with time data 46 included in the trace information 47. In this way, time data 46 obtained using the CPU 2 is associated with a process name 56 and a function name 59. Also, for a process in the hypervisor 21, a function name 59 is identified by searching for an instruction address 45 in the symbol map information 51A.

The analysis data 71 obtained in this way has a configuration in which a process name 56 and a function name 59 are associated with the time data 46, which makes it easy for a system administrator to grasp a processing flow on the server apparatus 1. For example, time required for usual processing by a process name 56 and a function name 59 is obtained. Therefore, if a processing time of the corresponding process name 56 and function name 59 is found to be abnormally great in the analysis data 71, it may be determined that the corresponding process and function are causes of overhead.

Next, with reference to flowcharts in FIGS. 8A-8C, collection of trace information 41 and symbol map information 51, and creation of analysis data 71 will be described. At Step S101, the hypervisor 21 starts information collection. At this moment, initial information is obtained that includes, for example, a sampling interval, the number of executions for information collection, and information about the virtual machine 22 or 23 from which information is collected. Next, at Step S102, an information collection process is started up, and at Step S103, a start signal is sent to the virtual machines 22-23 for information collection.

Next, at Step S104, the hypervisor 21 waits for a specified time. The specified time corresponds to the sampling interval obtained at Step S101. The sampling interval takes a value that is set in the server apparatus 1 beforehand. Whether the specified time has passed is determined by a count value of the performance counter in the CPU 2. If the specified time has passed (Step S104 YES), the procedure goes forward to Step S105, at which the trace information collecting section 11 collects the trace information 41.

Figure 8A:
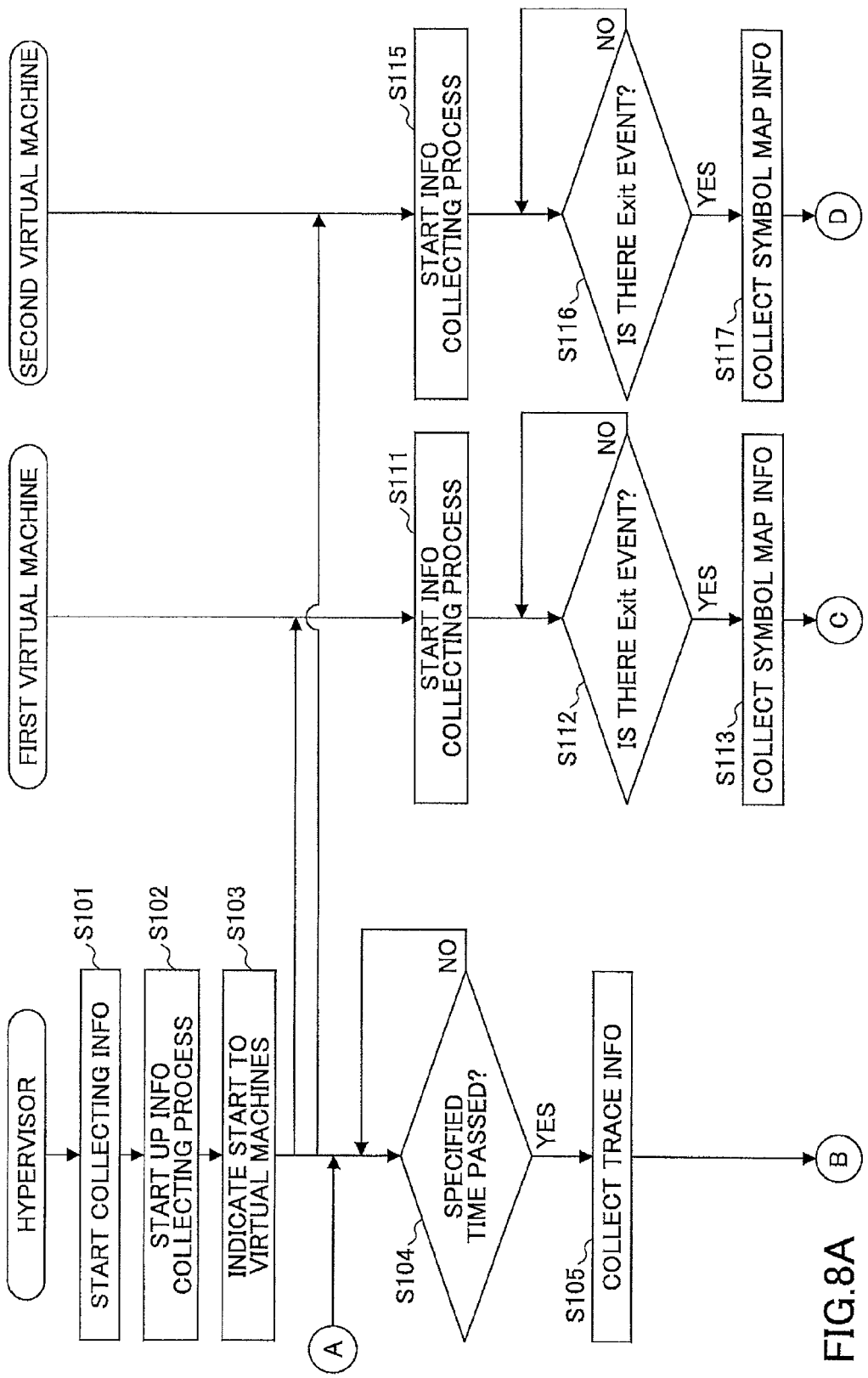
FIG. 8A is a first flowchart illustrating an example of a processing flow in a virtual computer system according to an embodiment of the present invention.
Figure 8B:
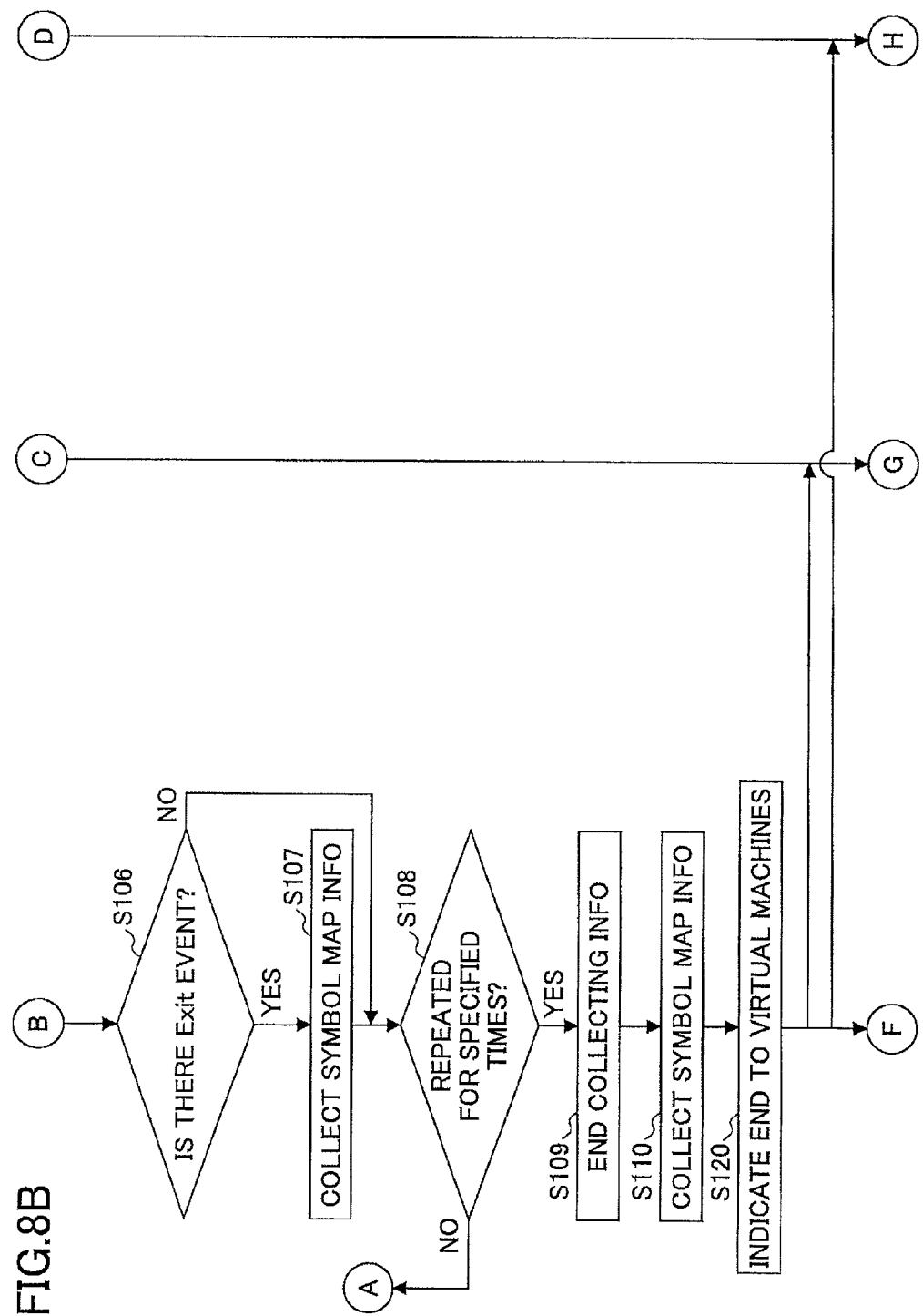
FIG. 8B is a second flowchart that is a continuation of the first flowchart in FIG. 8A.

Next, at Step S106 in FIG. 8B via continuation B, the symbol map information collecting section 13 determines whether there is an exit event of a process in the hypervisor 21. An exit event is, for example, an end of a process. If an exit event is generated, the process ends, which makes it impossible to obtain the symbol map information 51A of the process afterwards. Therefore, if an exit event is generated (Step S106 YES), the symbol map information collecting section 13 collects the symbol map information 51 of the hypervisor 21 that has executed a program related to the exit event at Step S107. On the other hand, if an exit event is not generated (Step S106 NO), the symbol map information 51A is not obtained at this step, and the procedure goes forward to Step S108.

At Step S108, the symbol map information collecting section 13 determines whether the information collection ends. If the number of executions of information collection passes the number initially set at Step S101 (Step S108 YES), information collection ends at Step S109. On the other hand, the number of executions of the information collection does not reach the number initially set, the number of executions is incremented, and the procedure goes back to Step S104 via continuation A to repeat the steps in between.

If the symbol map information collection ends at Step S109, the symbol map information collecting section 13 collects symbol map information 51A again at Step S110. Here, regardless of an exit event, information about all processes running on the hypervisor 21 is collected to generate the symbol map information 51A. Moreover, the symbol map information collecting section 13 appends the symbol map information 51A collected at Step S108. In this way, the symbol map information 51A for all processes are obtained that run on the hypervisor 21 during execution of the information collection process.

Meanwhile, as illustrated in FIG. 8A, in response to the start signal output from the hypervisor 21 at Step S103, the first virtual machine 22 starts up a process collecting the symbol map information 51 at Step S111. Then, the first virtual machine 22 determines whether there is an exit event at Step S112. If an exit event is generated (Step S112 YES), the symbol map information collecting section 13 collects the symbol map information 51 for a program related to the exit event at Step S113. If an exit event is not generated (Step S112 NO), symbol map information 51 is not obtained at the moment and therefore continues to wait for an exit event.

Similarly, in response to the start signal output from the hypervisor 21, the symbol map information collecting section 13 in the second virtual machine 23 starts up a process collecting the symbol map information 51 at Step S115. At Step S116, an exit event is checked and if an exit event is generated (Step S116 YES), the symbol map information collecting section 13 collects the symbol map information 51 of the program related to the exit event at Step S117. If an exit event is not generated (Step S116 NO), the symbol map information 51 is not obtained at the moment and therefore continues to wait for an exit event.

Next, at Step S120 in FIG. 8B, the symbol map information collecting section 13 of the hypervisor 21 outputs an end signal to the virtual machines 22-23. Later at Step S121 via continuation F in FIG. 8C, the trace information collecting section 11 of the hypervisor 21 outputs the trace information 41 to a file. Next, at Step S122, the symbol map information collecting section 13 of the hypervisor 21 outputs the symbol map information 51A to a file.

Meanwhile, in response to the end signal from the hypervisor 21, the symbol map information collecting section 13 of the first virtual machine 22 collects symbol map information 51B at Step S123 via continuation G. Here, regardless of an exit event, information about all processes running on the first virtual machine 22 is collected to create the symbol map information 51B. Moreover, a part of the symbol map information 51B is appended that has been collected by the symbol map information collecting section 13 at Step S113. In this way, the symbol map information 51B for all processes are obtained that run on the first virtual machine 22 during an execution of the information collection process. Next, at Step S124, the symbol map information collecting section 13 of the first virtual machine 22 outputs the symbol map information 51B to a file.

Similarly, in response to the end signal from the hypervisor 21, the symbol map information collecting section 13 of the second virtual machine 23 collects symbol map information 51C at Step S125 via continuation H. Here, regardless of an exit event, information about all processes running on the second virtual machine 23 is collected to create the symbol map information 51C. Moreover, a part of the symbol map information 51C is appended that has been collected by the symbol map information collecting section 13 at Step S117. In this way, the symbol map information 51C for all processes are obtained that run on the second virtual machine 23 during an execution of the information collection process. Next, at Step S126, the symbol map information collecting section 13 of the second virtual machine 23 outputs the symbol map information 51C to a file.

Next, at Step S131, the analysis processing section 16 of the hypervisor 21 starts a data collection process. Then, at Step S132, the data sending section 14 transfers the file of the symbol map information 51B on the first virtual machine 22 to the hypervisor 21. Similarly, at Step S133, the data sending section 14 transfers the file of the symbol map information 51C on the second virtual machine 22 to the hypervisor 21. Data transfer is carried out using a highly secured file transfer system, for example, scp (Secure Copy), or sshfs (SSH File System). In this way, information leakage from the virtual machines 22-23 can be avoided.

The hypervisor 21 receives the files of the symbol map information 51B-C from the virtual machines 22-23 at the data receiving section 15, then assigns the virtual machine numbers 48 to the corresponding symbol map information 51, respectively. Moreover, at Step S134, it outputs an indication of data receipt to the virtual machines 22-23. Consequently, at Step S135, the first virtual machine 22 ends the symbol collection process. Similarly, at Step S136, the second virtual machine 23 ends the symbol collection process. Moreover, at Step S141, the analysis processing section 16 combines the data files on the hypervisor 21, executes data analysis at Step S142, and generates analysis data 71 at Step S143, which concludes the procedure.

As described above, according to the present embodiment, the trace information 41 in which processes in the hypervisor 21 are arranged in a chronological order is augmented with the additional information 47 that includes information about directions to the virtual machines 22-23. This makes it possible to grasp processes executed by the virtual machines 22-23 in a process on the hypervisor 21, and to reduce load of the system as a whole compared to a case using virtual interruptions for each of the virtual machines 22-23.

Here, additional information 47 can be securely obtained by referring to a context saving area arranged in the CPU 2 provided for a virtual environment while maintaining security of the virtual machines 22-23. Moreover, by managing a sampling cycle using the performance counter of the CPU 2, and collecting data at the hypervisor 21 in a unified way, it is possible to collect data along a common time axis. Therefore, accurateness of time information on process executions can be made greater than a case where time is managed by software counters.

Moreover, the virtual machines 22-23 obtain a process ID 53, an instruction address 45, a process name 56, and a function name 59 on the guest OSes 25 and 27 as the symbol map information 51B-51C. Using the obtained data, a part of trace information 41 created by the hypervisor 21 is replaced to generate the analysis data 71. Using the analysis data 71, a system administrator can easily confirm a processing flow on the server apparatus 1, and analyze cause of overhead on the server apparatus 1. Application programs 26A-26C and 28A-28c executed on the virtual machines 22-23 are not provided by a system administrator, and it is difficult to grasp their behavior in detail. According to the present embodiment, it is possible to grasp an execution time of each process or function on the hypervisor 21 or the virtual machine 22 or 23 by referring and processing the analysis data 71 at the profile processing section 17. For example, if a system administrator searches for a process that has a longer execution time than usual by examining time data 46 in the analysis data 71, cause of overhead can be identified by analysis work with improved efficiency. In addition, collected processing data on the hypervisor 21 is similarly replaced, with which a processing flow on the server apparatus 1 can be confirmed even more easily by a system administrator.

Here, a computer terminal, as an analyzer, may be connected with the server apparatus 1 for creating analysis data 71. In this case, the analyzer includes at least an analysis processing section 16 illustrated in FIG. 1, and is configured to receive trace information 41 and symbol map information 51 from the server apparatus 1 to generate the analysis data 71.

Also, in the present embodiment, a management program for a virtual computer system is included that makes a computer function as a trace information collecting section 11, a symbol map information collecting section 13, and an analysis processing section 16. Moreover, the management program for a virtual computer system may be uploaded to a computer to be installed, or recorded in a recording medium according to the present embodiment. Also, the present embodiment may be applied to an OS, a hypervisor 21 in general, a driver module, a performance measurement and analysis tool, a performance management application, and a capacity management application.

Second Embodiment

A second embodiment of the present invention will be described. In the following, the same configuration elements as in the first embodiment are assigned with the same numerical codes, and their description may not be repeated. As illustrated in FIG. 9, a server apparatus 1 implementing a virtual computer system is functionally partitioned into a trace information collecting section 11, a start-of-collection indicating section 12, a symbol map information collecting section 13, a data sending section 14, a data receiving section 15, an analysis processing section 16, and a profile processing section 17. After the trace information collecting section 11 ends data collection, the start-of-collection indicating section 12 directs information collection to the virtual machine 22 or 23. After a sampling interrupt is generated, the symbol map information collecting section 13 collects symbol map information 51 upon a direction from the start-of-collection indicating section 12.

When generating analysis data with a sampling interrupt, first, the trace information collecting section 11 at the host side (hypervisor 21 side) first collects information from context saving areas of the virtual machines 22-23, which are associated with the virtual machine numbers 48, respectively, to generate trace information 41. The trace information 41 is transferred from the trace information collecting section 11 to the analysis processing section 16. After information collection ends at the trace information collecting section 11, the start-of-collection indicating section 12 sends a signal to the symbol map information collecting section 13 at the guest side (the virtual machine 22 or 23) that directs collection of symbol map information 51. Here, in the virtual machine 22 or 23 where information is to be collected as symbol map information 51, information about processes and the like are saved in the context saving area by the sampling interrupt. Therefore, the symbol map information collecting section 13 refers to the context saving area for generating symbol map information 51 of the virtual machine 22 or 23.

The symbol map information 51 is sent from the data sending section 14 of the virtual machine 22 or 23 to the data receiving section 15 of the hypervisor 21. The data receiving section 15 assigns the corresponding virtual machine number 48 to the symbol map information 51, then transfers it to the analysis processing section 16.

The analysis processing section 16 examines a correspondence between the virtual host number 48 and CR3 register information 47B (page table address value) to identify a process and a function name under execution on the virtual machine 22 or 23. Next, the profile processing section 17 analyzes operation of the virtual machine 22 or 23.

As described above, according to the present embodiment, symbol map information 51 collected on the virtual machine 22 or 23 is analyzed on the hypervisor 21. Moreover, on a sampling interrupt, process information on the host and process information on the virtual machine 22 or 23 is obtained to make a correspondence, with which a system administrator can confirm processes on the virtual machine 22 or 23. In this way, it is possible to correctly grasp processing status of the virtual computer system as a whole including states of the virtual machines 22-23 and processes of the virtual machines 22-23 and the hypervisor 21, with which the virtual computer system can be operated efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A virtual computer system comprising one or more processors configured to implement a plurality of virtual machines and a hypervisor, the one or more processors including:

a trace information collecting section in the hypervisor configured to collect trace information including an operational state of a process on a first virtual machine of the plurality of virtual machines from a context saving area corresponding to the first virtual machine, the process being automatically executed when an interrupt is generated;

a plurality of symbol map information collecting sections in the plurality of virtual machines, respectively, configured to automatically collect symbol map information for identifying a process operating on each of the plurality of virtual machines from a management area included in each of the plurality of virtual machines to send the collected symbol map information to the hypervisor in response to the interrupt;

a data sending section configured to send the collected symbol map information from each of the plurality of virtual machines;

an analysis processing section in the hypervisor configured to associate the trace information with the symbol map information for each of the processes operating on each of the plurality of virtual machines, wherein the trace information includes an execution address and a page table address value for each of the plurality of virtual machines, and the symbol map information includes a page table address and a process ID which are automatically set when a process operates on each of the plurality of virtual machines, and for each of the processes, the analysis processing section is configured to automatically identify a process ID by searching for the page table address in the symbol map information by using the page table address value in the trace information, to obtain a process name allocated to the process ID, and the analysis processing section is further configured to automatically identify a function address by searching for the page table address in the symbol map information by using the execution address in the trace information, to obtain a function name allocated to an area of the function address including the execution address; and performing a management operation to a virtual machine identified by the function name.

2. The virtual computer system as claimed in claim 1, wherein the trace information includes an identification number of the first virtual machine, the page table address value allocated to the process operating when the interrupt is generated, and the execution address,
- wherein the symbol map information includes an identification number of the process operating on each of the plurality of virtual machines, the page table address, the process ID, and a function name and a function address of a function executed in the process,
- wherein the analysis processing section associates the page table address value in the trace information with the page table address in the symbol map information, and associates the execution address in the trace information with the function name and the function address of the function in the symbol map information.

3. A method of managing a virtual computer system including a plurality of virtual machines operating on a hypervisor, the hypervisor being able to set an interrupt for each of one or more physical CPUs, the method comprising:
- automatically generating a CPU interrupt periodically;
- automatically collecting trace information including an operational state of a process on a first virtual machine of the plurality of virtual machines, the trace information being saved in a context saving area in the hypervisor upon the interrupt;
- automatically collecting symbol map information in each of the plurality of virtual machines for identifying a process operating on each of the plurality of virtual machines from a management area included in each of the plurality of virtual machines;
- automatically sending the collected symbol map information from each of the plurality of virtual machines; and
- automatically associating the trace information with the symbol map information for each of the processes operating on each of the plurality of virtual machines,
- wherein the trace information includes an execution address and a page table address value for each of the plurality of virtual machines, and the symbol map information includes a page table address and a process ID which are set when a process operates on each of the plurality of virtual machines, and
- the associating includes
  - automatically identifying a process ID by searching for the page table address in the symbol map information by using the page table address value in the trace information, to obtain a process name allocated to the process ID for each of the processes,
  - automatically identifying a function address by searching for the page table address in the symbol map information by using the execution address in the trace information, to obtain a function name allocated to an area of the function address including the execution address for each of the processes; and
- performing a management operation to a virtual machine identified by the function name.

4. A non-transitory computer-readable recording medium storing a program that causes a computer to execute a process for managing a virtual computer system including a plurality of virtual machines operating on a hypervisor, the hypervisor being able to set an interrupt for each of one or more physical CPUs, the process comprising:
- automatically generating a CPU interrupt periodically;
- automatically collecting trace information including an operational state of a process on a first virtual machine of the plurality of virtual machines, the trace information being saved in a context saving area in the hypervisor upon the interrupt;
- automatically collecting symbol map information in each of the plurality of virtual machines for identifying a process operating on each of the plurality of virtual machines from a management area included in each of the plurality of virtual machines to send the collected symbol map information from each of the plurality of virtual machines to the hypervisor in response to the interrupt; and
- automatically associating the trace information with the symbol map information for each of the processes,
  - wherein the trace information includes an execution address and a page table address value for each of the plurality of virtual machines, and the symbol map information includes a page table address and a process ID which are set when a process operates on each of the plurality of virtual machines, and the associating includes
  - automatically identifying a process ID by searching for the page table address in the symbol map information by using the page table address value in the trace information, to obtain a process name allocated to the process ID for each of the processes, and
  - automatically identifying a function address by searching for the page table address in the symbol map information by using the execution address in the trace information, to obtain a function name allocated to an area of the function address including the execution address for each of the processes; and
- performing a management operation to a virtual machine identified by the function name.

* * * * *